United States Patent
Chen et al.

Patent Number: 6,072,911
Date of Patent: Jun. 6, 2000

[54] LINEAR IMAGE FILTER AND THE CORRESPONDING FILTERING METHOD

[75] Inventors: Li-Ming Chen, Chilung; Wei-Chih Chang, Hsinchu Hsien, both of Taiwan

[73] Assignee: Winbond Electronics Corp., Hsinchu, Taiwan

[21] Appl. No.: 09/059,174

[22] Filed: Apr. 13, 1998

[30] Foreign Application Priority Data

Feb. 6, 1998 [TW] Taiwan ................................. 87101615

[51] Int. Cl.$^7$ .............................. G06K 9/56; G06K 9/40; G06T 5/20

[52] U.S. Cl. .......................... 382/260; 382/304; 382/307

[58] Field of Search ..................................... 382/205, 211, 382/299, 260, 261, 279, 278, 302, 304, 307

[56] References Cited

U.S. PATENT DOCUMENTS

| | | | |
|---|---|---|---|
| 4,845,767 | 7/1989 | Mori et al. | 362/41 |
| 5,644,646 | 7/1997 | Du et al. | 382/128 |
| 5,862,266 | 1/1999 | Hunter | 382/266 |

*Primary Examiner*—Scott Rogers
*Assistant Examiner*—Sankar Persaud
*Attorney, Agent, or Firm*—Ladas & Parry

[57] ABSTRACT

A linear image filter and the corresponding filtering method is disclosed. In conventional linear image filters, only one pixel can be processed during a single cycle because it is applied to an odd-order filter matrix. Consequently, the present linear image filter and the corresponding method expand the original odd-order filter matrix into an even-order matrix by adding a row and a column of zeros at the topmost/bottommost and the rightmost/leftmost of the original filter matrix. This not only increases the filtering speed of the linear image filter because four pixels can be simultaneously reconstructed, but also fully utilizes current 32-bit processors because a pixel is currently represented only as an 8-bit value.

13 Claims, 1 Drawing Sheet

LINEAR IMAGE FILTER AND THE CORRESPONDING FILTERING METHOD

FIELD OF THE INVENTION

The present invention relates in general to a filter and the corresponding filtering method, and in particular, to a linear image filter and the corresponding filtering method, which filters an input image by sliding four even-order filter matrixes which are expanded from an original odd-order filter matrix throughout the input image so that four central pixels enclosed by these four even-order filter matrixes can be reconstructed during a single cycle.

BACKGROUND OF THE INVENTION

Linear filtering is an important technique in image processing, which generally selects an odd-order filter matrix with its central element corresponding to a to-be-processed pixel, and slides the filter matrix throughout an input image so that each central pixel enclosed by the filter matrix can be reconstructed by linearly combining all pixels enclosed in the filter matrix with reference to values of corresponding elements in the filter matrix. In this case, the selected filter matrix is generally a symmetric odd-order matrix derived from adaptive signal processing, and the to-be-processed pixel is any central pixel enclosed by the odd-order filter matrix.

A detailed description of a 5-order filter matrix is presented below.

Table 1 lists a 5-order filter matrix W used in conventional image filters and the corresponding filtering method, where $W=\{W(i,j)|(i,j)\in S\}$ and $S=\{(i,j)|0\leq i\leq 4, 0\leq j\leq 4\}$ the size m×n of the filter matrix.

TABLE 1

|     | | | | | |
| --- | --- | --- | --- | --- | --- |
| W = | $W_{00}$ | $W_{01}$ | $W_{02}$ | $W_{03}$ | $W_{04}$ |
|     | $W_{10}$ | $W_{11}$ | $W_{12}$ | $W_{13}$ | $W_{14}$ |
|     | $W_{20}$ | $W_{21}$ | $W_{22}$ | $W_{23}$ | $W_{24}$ |
|     | $W_{30}$ | $W_{31}$ | $W_{32}$ | $W_{33}$ | $W_{34}$ |
|     | $W_{40}$ | $W_{41}$ | $W_{42}$ | $W_{43}$ | $W_{44}$ |

Then, the filter matrix W is slid across an m×n input image I, where $I=\{(i,j)|0\leq i\leq m-1, 0\leq j\leq n-1\}$. In this case, the central pixels of each 5×5 graphics window enclosed by the filter matrix W are respectively reconstructed by linearly combining all pixels enclosed by the filter matrix W according to values of corresponding filter matrix elements.

Thus, each reconstructed pixel of the reconstructed image R can be computed by:

$$R(k,p)=\Sigma\Sigma[I(k-i,p-j)*W(i,j)]$$

where $(i,j)\in S$, $(k,p)\in Q$, $Q=\{(k,p)|m/2\leq k\leq w-m/2, n/2\leq p\leq h-n/2\}$, w is the width of the input image and h is the length of the input image.

For instance, suppose the input image I is a 6-order matrix (as shown in Table 2) with $Q=\{(k,p)|2\leq k\leq w-2, 2\leq p\leq h-2\}$, the reconstructed images are then obtained using the above-mentioned equations:

$R(2,2)=\Sigma\Sigma[I(i,j)*W(i,j)]\ 0\leq i\leq 4, 0\leq j\leq 4$, $R(3,2)=\Sigma\Sigma[I(i,j)*W(i,j)]\ 1\leq i\leq 5, 0\leq j\leq 4$, $R(3,3)=\Sigma\Sigma[I(i,j)*W(i,j)]\ 1\leq i\leq 5, 1\leq j\leq 5$, and $R(2,3)=\Sigma\Sigma[I(i,j)*W(i,j)]\ 0\leq i\leq 4, 1\leq j\leq 5$.

And the corresponding reconstructed image is listed as Table 3.

TABLE 2

|     | | | | | | |
| --- | --- | --- | --- | --- | --- | --- |
| I = | $I_{00}$ | $I_{01}$ | $I_{02}$ | $I_{03}$ | $I_{04}$ | $I_{05}$ |
|     | $I_{10}$ | $I_{11}$ | $I_{12}$ | $I_{13}$ | $I_{14}$ | $I_{15}$ |
|     | $I_{20}$ | $I_{21}$ | $I_{22}$ | $I_{23}$ | $I_{24}$ | $I_{25}$ |
|     | $I_{30}$ | $I_{31}$ | $I_{32}$ | $I_{33}$ | $I_{34}$ | $I_{35}$ |
|     | $I_{40}$ | $I_{41}$ | $I_{42}$ | $I_{43}$ | $I_{44}$ | $I_{45}$ |
|     | $I_{50}$ | $I_{51}$ | $I_{52}$ | $I_{53}$ | $I_{54}$ | $I_{55}$ |

TABLE 3

|     | | | | | | |
| --- | --- | --- | --- | --- | --- | --- |
| R = | $R_{00}$ | $R_{01}$ | $R_{02}$ | $R_{03}$ | $R_{04}$ | $R_{05}$ |
|     | $R_{10}$ | $R_{11}$ | $R_{12}$ | $R_{13}$ | $R_{14}$ | $R_{15}$ |
|     | $R_{20}$ | $R_{21}$ | $R_{22}$ | $R_{23}$ | $R_{24}$ | $R_{25}$ |
|     | $R_{30}$ | $R_{31}$ | $R_{32}$ | $R_{33}$ | $R_{34}$ | $R_{35}$ |
|     | $R_{40}$ | $R_{41}$ | $R_{42}$ | $R_{43}$ | $R_{44}$ | $R_{45}$ |
|     | $R_{50}$ | $R_{51}$ | $R_{52}$ | $R_{53}$ | $R_{54}$ | $R_{55}$ |

However, there are several shortcomings to this linear image filter and the corresponding filtering method. Since the filter matrix W in this case is generally a symmetric odd-order matrix, only one central pixel can be processed during a single cycle. In addition, each pixel of the input image and each element of the filter matrix is represented by an 8-bit value, so current 32-bit processors, the most popular processor recently, can not be fully utilized.

SUMMARY OF THE INVENTION

Therefore, an object of the present invention is to provide a linear image filtering method according to an odd-order filter matrix, say N. The method is accomplished as: first, subsequently receiving an even-order graphics window of the graphics signal, say (N+1)×(N+1) window. Then, a row and a column of zeros are added at the topmost/bottommost and the leftmost/rightmost of the N-order filter matrix. The obtained (N+1)-order filtering matrices are used as new filtering windows. Then, four central pixels are reconstructed by linearly combining all pixels in the (N+1)×(N+1) graphics window according to elements in the four (N+1)-order filter matrices.

Another object of the present invention is to provide a linear image filter and the corresponding filtering method, which can reconstruct four pixels during a single cycle so as to increase the processing speed and fully utilize the 32-bit processor since a pixel, then, is only represented by 8 bits.

Another object of the present invention is to provide a linear image filter and the corresponding filtering method, which divides each graphics window into several small partitions and replaces large amount of multiplication with a multi-table look-up method. Therefore, the cost and time delay due to performing a large amount of multiplication can be reduced.

To achieve the above-indicated object and others, the present invention provides a linear image filter and a corresponding filtering method, which expands an original odd-order filter matrix to four even-order filter matrixes by adding a row of 0s at the topmost/bottommost of the original filter matrix and a column of 0s at the leftmost/rightmost of the original filter matrix, then sliding these four expanded filter matrixes throughout an input image and reconstructing four central pixels enclosed by these four filter matrixes through linearly combining all pixels enclosed therein according to values of corresponding filter matrix elements. In this application, since four central pixels are obtained during a single cycle, the image filtering speed is greatly increased.

BRIEF DESCRIPTION OF THE DRAWINGS

The following detailed description, given by way of example and not intended to limit the invention solely to the embodiments described herein, will best be understood in conjunction with the accompanying drawings, in which.

DESCRIPTION OF THE PREFERRED EMBODIMENT

Figure 1:
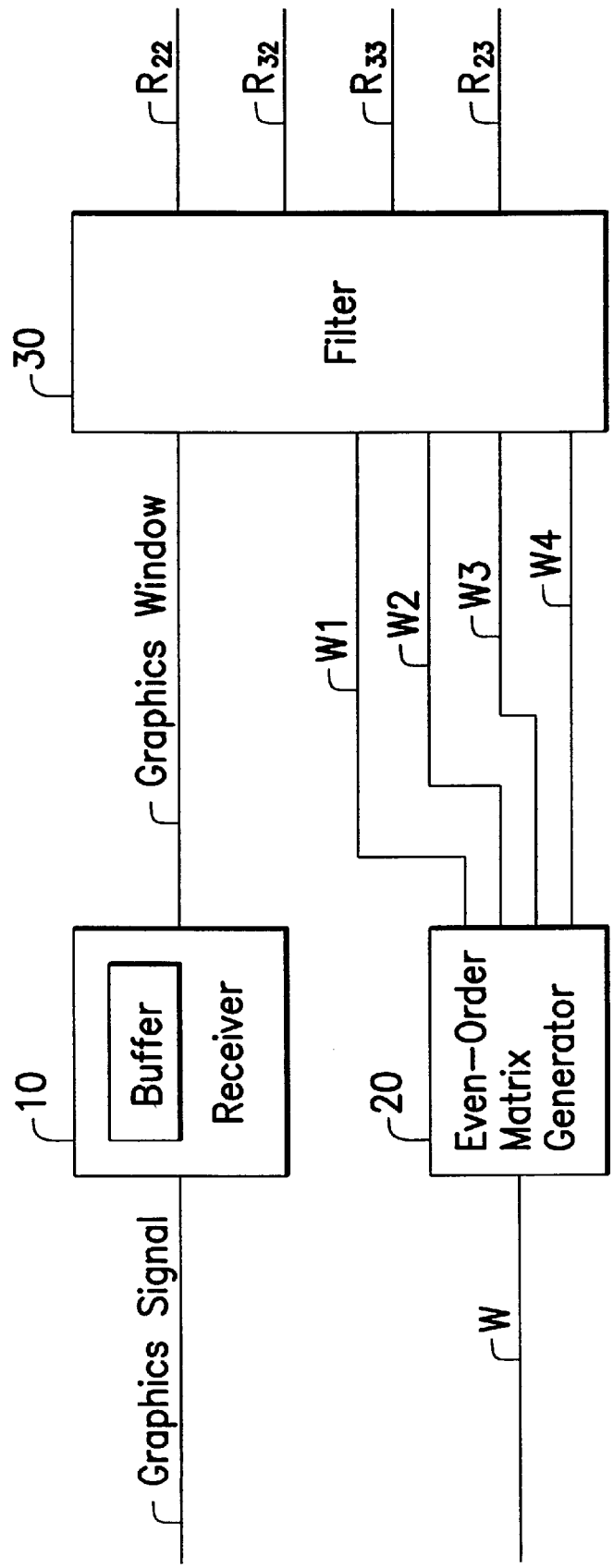
FIG. 1 depicts a block diagram of the linear image filter according to the present invention.

In conventional linear image filters, only one pixel can be processed during a single cycle. This precludes full utilization of the current 32-bit processor, since one pixel is only represented by an 8-bit value. Therefore, the present invention employs the feature that a 32-bit processor can simultaneously handle 4 pixels at one cycle, and extends original odd-order filter matrix into four even-order filter matrix by adding a row of zeros and a column of zeros so that the 32-bit processor is fully utilized and four pixels are processed during each cycle.

Detailed descriptions are provided below.

FIG. 1 is a block diagram of the linear image filter according to the present invention. In this embodiment, the linear image filter includes a receiver 10, an even-order matrix generator 20 and a filter 30.

The receiver 10, including a buffer therein, contiguously stores N input horizontal scan lines and sequentially outputs an (N+1)-order graphics window of the input graphics signal I, which is larger than original filter matrix by one row and one column. In this embodiment, the buffer may consist of N line buffers, respectively storing received N horizontal scan lines. Further, when the original filter matrix is a 5-order filter matrix, the receiver 10 may consist of 5 line buffers contiguously storing 5 horizontal scan lines. Then, a 6×6 graphics window of the graphics signal I is sequentially outputted when the $6^{th}$ horizontal scan line is inputted to the receiver 10. It should be noted that because the present invention can simultaneously handle four pixels during a single cycle, graphics windows are sequentially outputted by shifting two pixels each time.

The even-order matrix generator 20 then generates four (N+1)-order filter matrices by expanding the original N-order filter matrix, for example, by adding a row of zeros and a column of zeros to the original filter matrix. In this embodiment, four 6-order filter matrices W1,W2,W3,W4 are respectively derived by adding a row/column of zeros at the bottommost/rightmost of the original 5-order filter matrix W, by adding a row/column of zeros at the topmost/rightmost of the original 5-order filter matrix W, by adding a row/column of zeross at the bottommost/leftmost of the original 5-order filter matrix W and by adding a row/column of zeros at the bottommost/leftmost of the original 5-order filter matrix W. These 6-order filter matrix are represented as Table 4:

TABLE 4

| | | | | | | | |
|---|---|---|---|---|---|---|---|
| W1 = | $W_{00}$ | $W_{01}$ | $W_{02}$ | $W_{03}$ | $W_{04}$ | 0 |
| | $W_{10}$ | $W_{11}$ | $W_{12}$ | $W_{13}$ | $W_{14}$ | 0 |
| | $W_{20}$ | $W_{21}$ | $W_{22}$ | $W_{23}$ | $W_{24}$ | 0 |
| | $W_{30}$ | $W_{31}$ | $W_{32}$ | $W_{33}$ | $W_{34}$ | 0 |
| | $W_{40}$ | $W_{41}$ | $W_{42}$ | $W_{43}$ | $W_{44}$ | 0 |
| | 0 | 0 | 0 | 0 | 0 | 0 |
| W2 = | 0 | 0 | 0 | 0 | 0 | 0 |
| | $W_{00}$ | $W_{01}$ | $W_{02}$ | $W_{03}$ | $W_{04}$ | 0 |
| | $W_{10}$ | $W_{11}$ | $W_{12}$ | $W_{13}$ | $W_{14}$ | 0 |
| | $W_{20}$ | $W_{21}$ | $W_{22}$ | $W_{23}$ | $W_{24}$ | 0 |
| | $W_{30}$ | $W_{31}$ | $W_{32}$ | $W_{33}$ | $W_{34}$ | 0 |
| | $W_{40}$ | $W_{41}$ | $W_{42}$ | $W_{43}$ | $W_{44}$ | 0 |
| W3 = | 0 | $W_{00}$ | $W_{01}$ | $W_{02}$ | $W_{03}$ | $W_{04}$ |
| | 0 | $W_{10}$ | $W_{11}$ | $W_{12}$ | $W_{13}$ | $W_{14}$ |
| | 0 | $W_{20}$ | $W_{21}$ | $W_{22}$ | $W_{23}$ | $W_{24}$ |
| | 0 | $W_{30}$ | $W_{31}$ | $W_{32}$ | $W_{33}$ | $W_{34}$ |
| | 0 | $W_{40}$ | $W_{41}$ | $W_{42}$ | $W_{43}$ | $W_{44}$ |
| | 0 | 0 | 0 | 0 | 0 | 0 |
| W4 = | 0 | 0 | 0 | 0 | 0 | 0 |
| | 0 | $W_{00}$ | $W_{01}$ | $W_{02}$ | $W_{03}$ | $W_{04}$ |
| | 0 | $W_{10}$ | $W_{11}$ | $W_{12}$ | $W_{13}$ | $W_{14}$ |
| | 0 | $W_{20}$ | $W_{21}$ | $W_{22}$ | $W_{23}$ | $W_{24}$ |
| | 0 | $W_{30}$ | $W_{31}$ | $W_{32}$ | $W_{33}$ | $W_{34}$ |
| | 0 | $W_{40}$ | $W_{41}$ | $W_{42}$ | $W_{43}$ | $W_{44}$ |

In addition, since the row of zeros and the column of zeros are added to the 5-order filter matrix in such a specific way, that is, at the topmost/bottommost and rightmost/leftmost of the 5-order filter matrix, all pixels in each 6×6 graphics window can be linearly combined with reference to elements in these four 6-order filter matrixes to obtain four central pixels $R_{22},R_{32},R_{23},R_{33}$ in the next stage.

The filter 30, equipped with these four (N+1)-order filter matrices, then reconstruct four central pixels in the graphics windows by linearly combining all pixels in the (N+1)-order graphics windows according to elements of these four (N+1)-order filter matrices. In this embodiment, since most computers are supposed to have a 32-bit processor, the filter 30 can be implemented using a 32-bit processor. The 32-bit processor multiplies each pixel value in the 6×6 graphics window by the corresponding element values in four 6-order filter matrixes, then sums up the products thereof to have four reconstructed central pixels. These four reconstructed pixels are computed as:

$$R((N-1)/2,(N-1)/2)=\Sigma\Sigma[I(i,j)*W1(i,j)] \; (i,j) \in S$$

$$R((N+1)/2,(N-1)/2)=\Sigma\Sigma[I(i,j)* W2(i,j)] \; (i,j) \in S$$

$$R((N+1)/2,(N+1)/2)=\Sigma\Sigma[I(i,j)*W3(i,j)] \; (i,j) \in S$$

$$R((N-1)/2,(N+1)/2)=\Sigma\Sigma[I(i,j)*W4(i,j)] \; (i,j) \in S$$

In this embodiment, it should be noted that since 6×6 graphics window and 6-order filter matrix both includes 6×6=36 elements (or pixels), the linear image filter of the present invention can not obtain four reconstructed pixels before conducting 36 instances of multiplication and 35 instances of addition, which result in high hardware cost and an unacceptably slow speed. Consequently, the present invention can also divide 6×6 graphics window into several partitions and respectively look up corresponding products through different ROM tables. Four reconstructed pixels are then obtained by accumulating the products looked up. In this embodiment, while the input graphics signal is a binary signal and the 6×6 graphics window is divided into 6 partitions, four pixels can be obtained after only six instances of look-up and 5 instances of addition.

For example, when the input graphics signal is a binary signal as shown in Table 2, the 6×6 graphics window can be divided into six partitions, such as:

Index1=$\{I_{00},I_{10},I_{01},I_{11},I_{02},I_{12},I_{03},I_{13}\}$

Index2=$\{I_{20},I_{30},I_{21},I_{31},I_{22},I_{32},I_{23},I_{33}\}$

Index3=$\{I_{40},I_{50}, I_{41},I_{51},I_{42},I_{52},I_{43},I_{53}\}$

Index4=$\{I_{04},I_{14},I_{05},I_{15}\}$

Index5=$\{I_{24},I_{34},I_{25},I_{35}\}$

Index6=$\{I_{44},I_{54},I_{45},I_{55}\}$

In this case, six partial products for every reconstructed pixel are obtained by looking up six ROM tables according to Index 1 through Index 6. Then, the reconstructed pixels are obtained by summing up these six partial products. Table 5 illustrates the multi-table look-up method employed in this embodiment.

TABLE 5

|   | Index1 | → | $T1\_R_{22}$ | $T1\_R_{32}$ | $T1\_R_{23}$ | $T1\_R_{33}$ |
|---|---|---|---|---|---|---|
|   | Index2 | → | $T2\_R_{22}$ | $T2\_R_{32}$ | $T2\_R_{23}$ | $T2\_R_{33}$ |
|   | Index3 | → | $T3\_R_{22}$ | $T3\_R_{32}$ | $T3\_R_{23}$ | $T3\_R_{33}$ |
|   | Index4 | → | $T4\_R_{22}$ | $T4\_R_{32}$ | $T4\_R_{23}$ | $T4\_R_{33}$ |
|   | Index5 | → | $T5\_R_{22}$ | $T5\_R_{32}$ | $T5\_R_{23}$ | $T5\_R_{33}$ |
| +) | Index6 | → | $T6\_R_{22}$ | $T6\_R_{32}$ | $T6\_R_{23}$ | $T6\_R_{33}$ |
|   |   |   | $R_{22}$ | $R_{32}$ | $R_{23}$ | $R_{33}$ |

In this example, ROM table $T1\_R_{22}$ is structured as $2^8=256$ layer, for outputting partial product P(Index) of the reconstructed pixel $R_{22}$, which is an 8-bit value computed by:

P(Index1)=$I_{00}*W_{00}+I_{10}*W_{10}+I_{01}*W_{01}+I_{11}*W_{11}+I_{02}*W_{02}+I_{12}*W_{12}+I_{03}*W_{03}+I_{13}*W_{13}$ Table 6 then lists all other computation formulas of the above-mentioned partial products.

TABLE 6

| | Table size | Partial product |
|---|---|---|
| $T1\_R_{22}$ | 256 (layers) | $I_{00}*W_{00}+I_{10}*W_{10}+I_{01}*W_{01}+I_{11}*W_{11}+I_{02}*W_{02}+I_{12}*W_{12}+I_{03}*W_{03}+I_{13}*W_{13}$ |
| $T1\_R_{32}$ | 256 | $I_{00}*0+I_{10}*W_{10}+I_{01}*0+I_{11}*W_{11}+I_{02}*0+I_{12}*W_{12}+I_{03}*0+I_{13}*W_{13}$ |
| $T1\_R_{23}$ | 256 | $I_{00}*0+I_{10}*W_{01}+I_{11}*W_{11}+I_{02}*W_{02}+I_{12}*W_{12}+I_{03}*W_{03}+I_{13}*W_{13}$ |
| $T1\_R_{33}$ | 256 | $I_{00}*0+I_{10}*0+I_{01}*0+I_{11}*W_{11}+I_{02}*0+I_{12}*W_{12}+I_{03}*0+I_{13}*W_{13}$ |
| $T2\_R_{22}$ | 256 | $I_{20}*W_{20}+I_{30}*W_{30}+I_{21}*W_{21}+I_{31}*W_{31}+I_{22}*W_{22}+I_{32}*W_{32}+I_{23}*W_{23}+I_{33}*W_{33}$ |
| $T2\_R_{32}$ | 256 | $I_{20}*W_{10}+I_{30}*W_{20}+I_{21}*W_{11}+I_{31}*W_{21}+I_{22}*W_{12}+I_{32}*W_{22}+I_{23}*W_{13}+I_{33}*W_{23}$ |
| $T2\_R_{23}$ | 256 | $I_{20}*0+I_{30}*0+I_{21}*W_{20}+I_{31}*W_{30}+I_{22}*W_{21}+I_{32}*W_{31}+I_{23}*W_{22}+I_{33}*W_{32}$ |
| $T2\_R_{33}$ | 256 | $I_{20}*0+I_{30}*0+I_{21}*W_{10}+I_{31}*W_{20}+I_{22}*W_{11}+I_{32}*W_{21}+I_{23}*W_{12}+I_{33}*W_{22}$ |
| $T3\_R_{22}$ | 256 | $I_{40}*W_{40}+I_{50}*0+W_{41}+I_{51}*0+I_{42}*W_{42}+I_{32}*0+I_{43}*W_{43}+I_{53}*0$ |
| $T3\_R_{32}$ | 256 | $I_{40}*W_{30}+I_{50}*W_{40}+I_{41}*W_{31}+I_{51}*W_{41}+I_{42}*W_{32}+I_{32}*W_{22}+I_{43}*W_{33}+I_{53}*W_{43}$ |
| $T3\_R_{23}$ | 256 | $I_{40}*0+I_{50}*0+I_{41}*W_{30}+I_{51}*0+I_{42}*W_{31}+I_{32}*0+I_{43}*W_{32}+I_{53}*0$ |
| $T3\_R_{33}$ | 256 | $I_{40}*0+I_{50}*0+I_{41}*W_{30}+I_{51}*W_{40}+I_{42}*W_{42}+I_{32}*W_{21}+I_{43}*W_{32}+I_{53}*W_{42}$ |
| $T4\_R_{22}$ | 16 | $I_{04}*W_{04}+I_{14}*W_{14}+I_{05}*0+I_{15}*0$ |
| $T4\_R_{32}$ | 16 | $I_{04}*0+I_{14}*W_{04}+I_{05}*0+I_{15}*0$ |
| $T4\_R_{23}$ | 16 | $I_{04}*W_{03}+I_{14}*W_{13}+I_{05}*W_{04}+I_{15}*W_{14}$ |
| $T4\_R_{33}$ | 16 | $I_{04}*0+I_{14}*W_{03}+I_{05}*0+I_{15}*W_{04}$ |
| $T5\_R_{22}$ | 16 | $I_{24}*W_{24}+I_{34}*W_{34}+I_{25}*0+I_{35}*0$ |
| $T5\_R_{32}$ | 16 | $I_{14}*W_{24}+I_{24}*W_{34}+I_{25}*0+I_{35}*0$ |
| $T5\_R_{23}$ | 16 | $I_{24}*W_{23}+I_{34}*W_{33}+I_{25}*W_{24}+I_{35}*W_{34}$ |
| $T5\_R_{33}$ | 16 | $I_{24}*W_{13}+I_{34}*W_{23}+I_{25}*W_{14}+I_{35}*W_{24}$ |
| $T6\_R_{22}$ | 16 | $I_{44}*W_{44}+I_{54}*0+I_{45}*0+I_{55}*0$ |
| $T6\_R_{32}$ | 16 | $I_{44}*W_{54}+I_{54}*W_{44}+I_{45}*0+I_{55}*0$ |
| $T6\_R_{23}$ | 16 | $I_{44}*W_{43}+I_{54}*0+I_{45}*W_{44}+I_{55}*W_{54}$ |
| $T6\_R_{33}$ | 16 | $I_{44}*W_{33}+I_{54}*W_{43}+I_{45}*W_{34}+I_{55}*W_{44}$ |

Consequently, when the input graphics signal is a binary signal, four reconstructed pixels can be obtained after only expanding the necessary look-up time and performing 5 instances of addition.

Summing up the above, the linear image filter of the present invention is expands an original odd-order filter matrix into several even-order filter matrices. This allows four reconstructed pixels to be processed during a single cycle, and allows the 32-bit processor to be fully utilized, thus greatly increasing the filtering speed of the linear image filter.

The foregoing description of a preferred embodiment of the present invention has been provided for the purposes of illustration and description only. It is not intended to be exhaustive or to limit the invention to the precise forms disclosed. Many modifications and variations will be apparent to practitioners skilled in this art. The embodiment was chosen and described to best explain the principles of the present invention and its practical application, thereby enabling those who are skilled in the art to understand the invention for various embodiments and with various modifications as are suited to the particular use contemplated. It is intended that the scope of the invention be defined by the following claims and their equivalents.

What is claimed is:

1. A linear image filtering method for linear filtering a graphics signal according to an N-order filter matrix, where N is an odd integer, comprising:

subsequently receiving an (N+1)×(N+1) graphics window of the graphics signal;

adding a row of zeros at the topmost/bottommost of the N-order filter matrix and a column of zeros at the leftmost/rightmost of the N-order filter matrix to obtain four (N+1)-order filter matrixes; and reconstructing four central pixels by linearly combining all pixels in the (N+1)×(N+1) graphics window according to elements in the four (N+1)-order filter matrices.

2. The linear image filtering method as claimed in claim 1, wherein the four (N+1)-order filter matrixes are obtained by adding a row of zeros at the bottommost of the N-order filter matrix and a column of zeros at the rightmost of the N-order filter matrix, adding a row of zeros at the topmost of the N-order filter matrix and a column of zeros at the rightmost of the N-order filter matrix, adding a row of zeros at the topmost of the N-order filter matrix and a column of zeros at the leftmost of the N-order filter matrix and adding a row of zeros at the bottommost of the N-order filter matrix and a column of zeros at the leftmost of the N-order filter matrix, respectively corresponding to pixel((N−1)/2,(N−1)/2), pixel((N+1)/2,(N−1)/2), pixel((N+1)/2,(N+1)/2) and pixel((N−1)/2,(N+1)/2) in the (N+1)×(N+1) graphics window.

3. The linear image filtering method as claimed in claim 1, wherein each pixel in the four (N+1)-order filter matrixes and each element in the (N+1)-order image matrix is represented as an 8-bit value.

4. The linear image filtering method as claimed in claim 1, wherein the four reconstructed pixels are respectively obtained by accumulating the product of each pixel in the (N+1)×(N+1) graphics window and the corresponding element in the four (N+1)-order filter matrices.

5. The linear image filtering method as claimed in claim 4, wherein the four central pixels are reconstructed using the multi-table look-up method.

6. The linear image filtering method as claimed in claim 1, wherein the four central pixels are reconstructed using a 32-bit processor so that four central pixels can be reconstructed simultaneously.

7. A linear image filter for linear filtering a graphics signal according to an N-order filter matrix, where N is an odd integer, comprising:

a receiver storing the graphics signal and sequentially outputting an (N+1)×(N+1) graphics window of the graphics signal;

a n even-order matrix generator adding a row of zeros at the topmost/bottommost of the N-order filter matrix and a column of zeros at the rightmost/leftmost of the N-order filter matrix to obtain four (N+1)-order filter matrixes; and a filter reconstructing four central pixels by respectively performing linear combination of all pixels in the (N+1)×(N+1) graphics window according to corresponding elements in the four (N+1)-order image matrices.

8. The linear image filter as claimed in claim 7, wherein the N-order filter matrix is a 5-order filter matrix derived from an adaptive signal process, and the (N+1)-order image matrix is a 6-order image matrix.

9. The linear image filter as claimed in claim 7, wherein the four (N+1)-order filter matrices are obtained by adding a row of zeros at the bottommost of the N-order filter matrix and a column of zeros at the rightmost of the N-order filter matrix, adding a row of zeros at the topmost of the N-order filter matrix and a column of zeros at the rightmost of the N-order filter matrix, adding a row of zeros at the topmost of the N-order filter matrix and a column of zeros at the leftmost of the N-order filter matrix and adding a row of zeros at the bottommost of the N-order filter matrix and a column of zeros at the leftmost of the N-order filter matrix, respectively corresponding to pixel((N−1)/2,(N−1)/2), pixel((N+1)/2,(N−1)/2), pixel((N+1)/2,(N+1)/2) and pixel((N−1)/2,(N+1)/2) of the (N+1)×(N+1) graphics window.

10. The linear image filter as claimed in claim 8, wherein each pixel of the (N+1)-order filter matrices and each element in the (N+1)-order graphics window are represented by an 8-bit value.

11. The linear image filter as claimed in claim 7, wherein the filter is provided for respectively accumulating the product of each pixel in the (N+1)×(N+1) graphics window and the corresponding pixel in the four (N+1)-order filter matrices to reconstruct the four central pixels.

12. The linear image filter as claimed in claim 11, wherein the filter is accomplished using the multi-table look-up method.

13. The linear image filter as claimed in claim 7, wherein the filter is achieved by a 32-bit processor so that four central pixels can be simultaneously processed.

* * * * *